US012688570B2

(12) United States Patent
Huang et al.

(10) Patent No.: US 12,688,570 B2
(45) Date of Patent: Jul. 21, 2026

(54) METHOD AND SYSTEM FOR PERFORMING POINT-TO-POINT WHITE REFERENCE CORRECTION ON HYPERSPECTRAL IMAGE

(71) Applicant: SHENZHEN HYPERNANO OPTICS TECHNOLOGY CO., LTD., Shenzhen (CN)

(72) Inventors: Jinbiao Huang, Shenzhen (CN); Xingchao Yu, Shenzhen (CN); Zhe Ren, Shenzhen (CN); Bin Guo, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 253 days.

(21) Appl. No.: 18/717,219

(22) PCT Filed: Jan. 30, 2023

(86) PCT No.: PCT/CN2023/073836
§ 371 (c)(1),
(2) Date: Jun. 6, 2024

(87) PCT Pub. No.: WO2023/104220
PCT Pub. Date: Jun. 15, 2023

(65) Prior Publication Data
US 2025/0037312 A1      Jan. 30, 2025

(30) Foreign Application Priority Data
Dec. 6, 2021      (CN) .......................... 202111477742.X

(51) Int. Cl.
*G06T 7/00*        (2017.01)
*G01N 21/27*      (2006.01)
(Continued)

(52) U.S. Cl.
CPC ........... *G06T 7/0002* (2013.01); *G01N 21/27* (2013.01); *G06T 7/0004* (2013.01); *G06T 7/11* (2017.01);
(Continued)

(58) Field of Classification Search
CPC ....... G06T 7/00; G06T 7/0002; G06T 7/0004; G06T 7/11; G06T 7/80; G06T 7/90;
(Continued)

(56) References Cited

U.S. PATENT DOCUMENTS 11,410,295 B2 *  8/2022  Nipe ..................... G06T 7/0008
11,443,417 B2 *  9/2022  Nipe ..................... G06V 10/82
(Continued)

FOREIGN PATENT DOCUMENTS

CN          104280349 A      1/2015
CN          109991174 A  *  7/2019  ............. G01N 21/25
(Continued)

OTHER PUBLICATIONS

International search report of application No. PCT/CN2023/073836 dated May 25, 2023.

*Primary Examiner* — Scott A Rogers
(74) *Attorney, Agent, or Firm* — Calfee, Halter & Griswold LLP

(57)        ABSTRACT

A method for performing point-to-point whiteboard parameter ratio correction on a hyperspectral image includes: capturing hyperspectral data of a standard reference whiteboard in advance as white(x,y,w), and storing the records, then captures hyperspectral data of a sample as sample(x,y, w); then selecting an unobstructed and unshaded whiteboard area within a certain range of the hyperspectral data sample (x,y,w) of the test sample, and labeling the area as Area A; calculating a spectral average of the ROI on the sample image as $S_A(w)$; calculating a spectral average of whiteboard (Continued)

data in the same position as the ROI as $W_A(w)$; dividing the two spectral averages, and obtaining a correction coefficient $alpha(w)=W_A(w)./S_A(w)$; multiplying the whiteboard parameter ratio correction coefficient $alpha(w)$ by a sample reflectance image matrix after whiteboard parameter ratio correction to obtain a final hyperspectral reflectance image matrix $REFL(x,y,w)=alpha(w).*sample(x,y,w)./white(x,y,w)$.

9 Claims, 8 Drawing Sheets

(51) Int. Cl.

| | |
|---|---|
| *G06T 7/11* | (2017.01) |
| *G06T 7/80* | (2017.01) |
| *G06T 7/90* | (2017.01) |
| *G06V 10/25* | (2022.01) |
| *G06V 10/56* | (2022.01) |
| *G06V 10/58* | (2022.01) |
| *H04N 23/88* | (2023.01) |
| *G01J 3/28* | (2006.01) |

(52) U.S. Cl.
CPC .................. *G06T 7/80* (2017.01); *G06T 7/90* (2017.01); *G06V 10/25* (2022.01); *G06V 10/56* (2022.01); *G06V 10/58* (2022.01); *H04N 23/88* (2023.01); *G01J 3/28* (2013.01); *G06T 2207/10036* (2013.01)

(58) Field of Classification Search
CPC . G06T 2207/10004; G06T 2207/10024; G06T 2207/10036; G06T 2207/20164; G06V 10/25; G06V 10/46; G06V 10/56; G06V 10/58; H04N 1/6077; H04N 23/88; G01N 21/27; G01J 3/28–2896
See application file for complete search history.

(56) References Cited

U.S. PATENT DOCUMENTS

| | | | | |
|---|---|---|---|---|
| 2024/0288308 A1* | 8/2024 | Tissera | ................ | G06V 10/143 |
| 2024/0290091 A1* | 8/2024 | Tissera | ................ | G06V 10/143 |

FOREIGN PATENT DOCUMENTS

| | | | | | |
|---|---|---|---|---|---|
| CN | 110441249 A | | 11/2019 | | |
| CN | 113920113 A | | 1/2022 | | |
| CN | 115147296 B | * | 1/2026 | .............. | G06T 5/70 |
| JP | 2009115498 A | | 5/2009 | | |

* cited by examiner

100

103

102

101

104

105

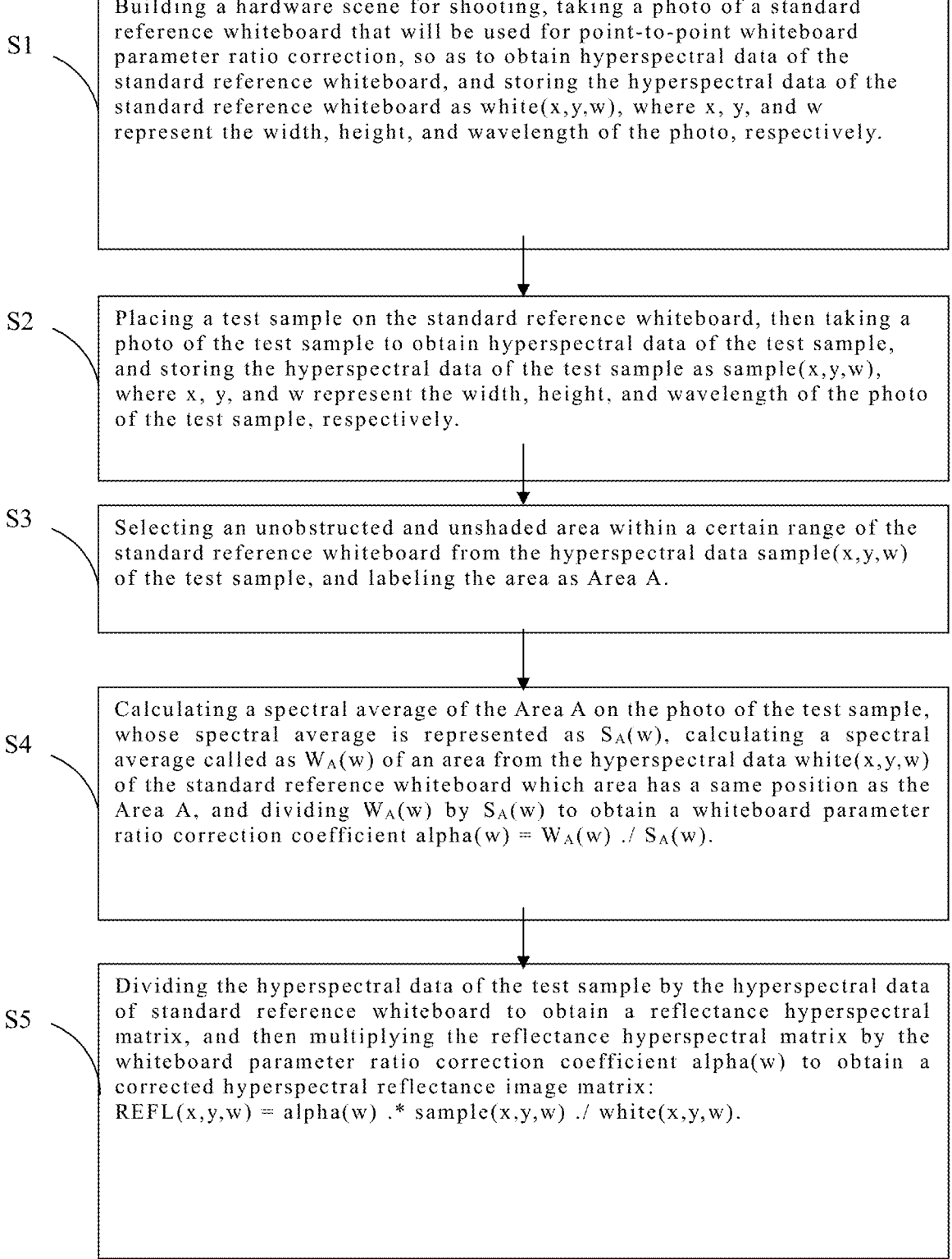

S1

Building a hardware scene for shooting, taking a photo of a standard reference whiteboard that will be used for point-to-point whiteboard parameter ratio correction, so as to obtain hyperspectral data of the standard reference whiteboard, and storing the hyperspectral data of the standard reference whiteboard as white(x,y,w), where x, y, and w represent the width, height, and wavelength of the photo, respectively.

S2

Placing a test sample on the standard reference whiteboard, then taking a photo of the test sample to obtain hyperspectral data of the test sample, and storing the hyperspectral data of the test sample as sample(x,y,w), where x, y, and w represent the width, height, and wavelength of the photo of the test sample, respectively.

S3

Selecting an unobstructed and unshaded area within a certain range of the standard reference whiteboard from the hyperspectral data sample(x,y,w) of the test sample, and labeling the area as Area A.

S4

Calculating a spectral average of the Area A on the photo of the test sample, whose spectral average is represented as $S_A(w)$, calculating a spectral average called as $W_A(w)$ of an area from the hyperspectral data white(x,y,w) of the standard reference whiteboard which area has a same position as the Area A, and dividing $W_A(w)$ by $S_A(w)$ to obtain a whiteboard parameter ratio correction coefficient alpha(w) = $W_A(w)$ ./ $S_A(w)$.

S5

Dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha(w) to obtain a corrected hyperspectral reflectance image matrix:
REFL(x,y,w) = alpha(w) .* sample(x,y,w) ./ white(x,y,w).

Fig. 2 protective cover 303 recess area 302 on the whiteboard whiteboard base 301 hyperspectral camera 401     light source 402 quartz glass 405 jewelry testing
black box 403 sample placement
table 404 the rotation axis of
the door switch 406 the surface of
the door 407 door handle 408

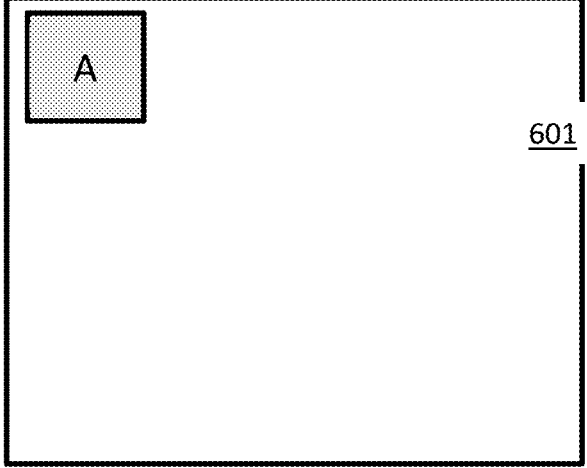
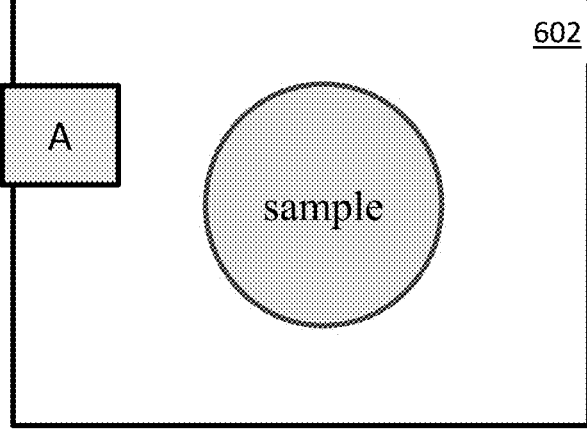
Fig. 6

801

Whiteboard hyperspectral data acquisition module

802

Sample hyperspectral data acquisition module

803

Reference area selection module

804

Whiteboard parameter ratio correction coefficient acquisition module

805

Whiteboard parameter ratio correction module

METHOD AND SYSTEM FOR PERFORMING POINT-TO-POINT WHITE REFERENCE CORRECTION ON HYPERSPECTRAL IMAGE

CROSS REFERENCE OF RELATED APPLICATION

This application is the national stage entry of PCT/CN2023/073836, filed Jan. 30, 2023, which claims priority to Chinese patent application number CN202111477742. X filed on Dec. 6, 2021, the disclosures of which are incorporated by reference.

TECHNICAL FIELD

The present application relates to the technical field of hyperspectral analysis, in particular to a method and system for performing point-to-point whiteboard parameter ratio correction of hyperspectral image.

BACKGROUND

Hyperspectral imaging technology can obtain image information and spectral information at the same time, in the image dimension, it can be combined with machine vision technology to distinguish object images while also can analyze material components in the spectral dimension, which is a new technology with great potential. The spectral analysis ability of hyperspectral imaging technology comes from the spectral information obtained by recording the interaction between light and matter at different wavelengths, which corresponds to the physical and chemical composition of the object.

The interaction process between light and matter is described as: when the incident light falls on a substance, the composition of the substance will absorb, reflect, and scatter the light, thus changing the spectral shape of the reflected (or transmitted) light, the different components of a substance have different effects on light, which results in different spectral shapes of substances with different compositions. The objective spectral shape of reflected or transmitted light varies depending on the shape of the light source, but the spectrum of relative reflectance (transmittance) is independent of the light source. Especially for some application scenarios that require high analysis accuracy, calculating reflectance spectra is an indispensable step. The general method to obtain reflectance is to perform whiteboard parameter ratio correction.

Considering that a small amount of contamination on the whiteboard will affect the calculation of the entire calibration parameters and seriously affect the accuracy of calibration during use, a protection structure for the reference area is designed to ensure that reliable data can be collected in the selected reference area, and to ensure the accuracy and stability of applying the aforementioned algorithm for whiteboard parameter calibration. Meanwhile, for some samples with high transmittance, such as jade or crystal, in addition to the reference area, whether the whiteboard area for placing samples is contaminated also affects the calibration accuracy.

There are mainly two existing whiteboard parameter ratio correction schemes:

1. On a sample shooting surface, the hyperspectral data of a standard whiteboard is captured first as data_white(x,y,w) to record the spectral shape of the light source at each spatial position (where x, y and w represent the width, height and wavelength of the photo respectively), and then capturing the hyperspectral data of the sample as data_sample(x,y,w). Performing matrix element-wise division between the hyperspectral data of the sample and the hyperspectral data of the whiteboard to obtain the reflectivity of the sample, then recording the reflectivity as REFL(x,y,w), this method can perform whiteboard parameter ratio correction on each pixel separately, but it requires two shots to obtain the reflectance spectrum of the sample. The process is complex, and there may be equipment stability errors between the two shots.

2. When taking the hyperspectral data data_sample(x,y,w) of a sample, placing a small whiteboard next to the sample to record the spectral shape of the light source as data_white (1,1, w). Making x copies of the spectral matrix in first-dimension to obtain data_white(x,1, w), and then making y copies of the data_white(x,1, w) in the second-dimension to obtain the hyperspectral data data_white(x,y,w) of the whiteboard. Performing matrix element-wise division between the hyperspectral data of the sample and the hyperspectral data of the whiteboard to obtain the REFL(x,y,w) of the sample. This method only requires one shot and the process is simple, but the spectral shape of light source of each pixel in the hyperspectral image dimension is regarded as the same by default, without considering the errors caused by the non-uniformity of the light source, camera imaging chip, and ambient light, etc.

At present, the industry lacks a simple and highly accurate point-to-point whiteboard parameter ratio correction method for each pixel in hyperspectral data.

SUMMARY

The present application proposes a method and system for performing point-to-point whiteboard parameter ratio correction of hyperspectral image to address the shortcomings of the prior art mentioned above.

In one aspect, the present application proposes a method for performing point-to-point whiteboard parameter ratio correction of hyperspectral image, comprising the following steps of:

S1: placing a test sample on a standard reference whiteboard, then taking a photo of the test sample to obtain hyperspectral data of the test sample, and storing the hyperspectral data of the test sample as sample(x,y,w), where x, y, and w represent the width, height, and wavelength of the photo of the test sample, respectively;

S2: selecting an unobstructed and unshaded area within a certain range of the standard reference whiteboard from the hyperspectral data sample(x,y,w) of the test sample, and labeling the area as Area A;

S3: calculating a spectral average of the Area A on the photo of the test sample, whose spectral average is represented as $S_A(w)$, calculating a spectral average called as $W_A(w)$ of an area from hyperspectral data called as white(x,y,w) of the standard reference whiteboard obtained by taking a photo of the standard reference whiteboard, which area has a same position as the Area A, and dividing $W_A(w)$ by $S_A(w)$ to obtain a whiteboard parameter ratio correction coefficient alpha(w)=$W_A(w)./S_A(w)$; and S4: dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha (w) to obtain a corrected hyperspectral reflectance image matrix:

$$REFL(x, y, w) = alpha\ (w). * sample\ (x, y, w). / white\ (x, y, w).$$

Firstly, the above methods apply a more accurate whiteboard parameter ratio correction method for hyperspectral photos with multiple frames of images. From a single hyperspectral photograph of a sample, it can restore the spectral information of light source of each pixel on the photographed surface according to the spectral curve of a small region of a fixed whiteboard and the whiteboard correction parameters in the memory. Then, the restored whiteboard spectral information of each pixel is used to perform point-to-point whiteboard parameter ratio correction on the hyperspectral data of the sample. Secondly, this method not only applies a more accurate whiteboard parameter ratio correction method for hyperspectral images (considering the possible error of whiteboard parameters of multi-frame images), but also restores the light source spectral data of each pixel on the photographed surface from a single hyperspectral photo of the sample based on the spectral curve of a fixed whiteboard small area and combined with the whiteboard correction parameters in memory. Accurate point-to-point whiteboard parameter ratio correction is performed on the hyperspectral data of the sample by applying the restored light source spectral data of each pixel.

The standard whiteboard used in this method is the reflectance whiteboard used for instrument calibration, which has high reflectivity, flat and uniform surface, good diffusivity and good stability. And its reflection spectrum lines can be used to represent the spectrum of light source, so as to calculate the reflectance spectrum of the object.

Using the method in the present application has the following beneficial effects:

1. It can simplify the hyperspectral analysis process. Normal hyperspectral analysis mainly comprises three parts: sample spectrum collection, reference spectrum collection, and data processing analysis; since the present application does not require separate collection of spectra of whiteboard, the reference spectrum collection part can be omitted, simplifying the process into two parts reduces data collection time and increases analysis efficiency.

2. The accuracy of reflection spectrum calculation can be increased by using the method of the present application. In the technical solution of the present application, it is not necessary to re-shoot the whiteboard every time, the light source spectral data of each pixel on the whiteboard can be restored based on the prestored whiteboard data (the light source spectral data is based on the type of light source and the brightness of the light source in this shooting) through an algorithm, so as to achieve a point-to-point whiteboard correction of the sample, which correction can avoid errors caused by uneven light sources.

For transparent or translucent objects such as jade and gemstone, using this method and device can improve the accuracy of hyperspectral analysis effectively.

3. Using data of a same shot for whiteboard parameter ratio correction can avoid additional errors caused by subtle changes of equipment hardware or environment between two shots (the shootings of the whiteboard and the sample), greatly increasing the reliability and repeatability of the measurement.

In the specific embodiments, the hyperspectral data called as white(x,y,w) of the standard reference whiteboard is obtained by: building a hardware scene for shooting, taking the photo of the standard reference whiteboard that will be used for point-to-point whiteboard parameter ratio correction, so as to obtain the hyperspectral data of the standard reference whiteboard, storing hyperspectral data of the standard reference whiteboard in advance as a prestored hyperspectral data of standard reference whiteboard, and using the prestored hyperspectral data of the standard reference whiteboard as the hyperspectral data of the standard reference whiteboard.

In the specific embodiments, the standard reference whiteboard specifically comprises a whiteboard base:

The base thickness of the whiteboard is m millimeters, the shape and size of the outer contour of the whiteboard are designed according to the specific application scenario of the shooting, the shapes comprise square, round and oval.

The upper surface of the whiteboard base is covered with a coating with isotropic homogeneous diffuse reflection characteristics, and is provided with a recess area, called Area A, which recess area has the depth of n millimeters (m>n), and the bottom and side walls of which recess area have a same diffuse reflection characteristic as that of the upper surface of the standard reference whiteboard, for comprising a diffuse reflection coating.

The recess area has one or more different location areas which have different shapes and sizes on the standard reference whiteboard.

In the specific embodiments, the standard reference whiteboard specifically comprises a protective cover:

The protective cover is a layer of spectral transparent material covering the surface of the standard reference whiteboard, which spectral transparent material is selected according to practical applications, comprises a transparent material with no obvious absorption characteristics within a spectral band range tested, and has wear resistance and easy cleaning characteristics, and has a thickness range of 0 to 10 millimeters.

The spectral transparent material specifically comprises quartz glass and sapphire crystal.

The protective cover is assembled on the recess area of the standard reference whiteboard, wherein the number of protective covers is the same as the number of the recess area.

In the specific embodiments, during taking the photo of the standard reference whiteboard that will be used for point-to-point whiteboard parameter ratio correction, the protective cover is assembled on the whiteboard base to obtain an assembled standard reference whiteboard, and then the assembled standard reference whiteboard is placed on a shooting surface of the hardware scene for shooting the test sample.

During taking the photo of the test sample, the test sample is placed on an area within the assembled standard reference whiteboard, which is not protected by the protective cover.

In the specific embodiments, when the whiteboard base is contaminated to a certain extent, the contaminated whiteboard base is replaced with a whiteboard base that has the same structure as the standard reference whiteboard.

The replacement is carried out at a fixed time interval or after shooting several test samples.

In the specific embodiments, the method further comprises: analyzing the test sample based on the corrected hyperspectral reflectance image matrix and with a trained chemometric model that comprises K-nearest neighbor (KNN), support vector machine (SVM), artificial neural network (ANN), and deep neural network (NN).

According to the second aspect of the present application, a non-transitory computer-readable medium for storing executable instructions is proposed, which cause the method above to be performed.

According to the third aspect of the present application, a system for performing point-to-point whiteboard parameter ratio correction of hyperspectral image is proposed, it comprises:

Sample hyperspectral data acquisition module: configured for placing a test sample on the standard reference whiteboard, then taking a photo of the test sample to obtain hyperspectral data of the test sample, and storing the hyperspectral data of the test sample as sample(x,y,w), where x, y, and w represent the width, height, and wavelength of the photo of the test sample, respectively;

Reference area selection module: configured for selecting an unobstructed and unshaded area within a certain range of the standard reference whiteboard from the hyperspectral data sample(x,y,w) of the test sample, and labeling the area as Area A;

Whiteboard parameter ratio correction coefficient acquisition module: configured for calculating a spectral average of the Area A on the photo of the test sample, whose spectral average is represented as $S_A(w)$, calculating a spectral average called as $W_A(w)$ of an area from hyperspectral data called as white(x,y,w) of the standard reference whiteboard obtained by taking a photo of the standard reference whiteboard, which area has a same position as the Area A, and dividing $W_A(w)$ by $S_A(w)$ to obtain a whiteboard parameter ratio correction coefficient alpha(w)=$W_A(w)./S_A(w)$; and Whiteboard parameter ratio correction module: configured for dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha(w) to obtain a corrected hyperspectral reflectance image matrix:

$$REFL(x, y, w) = alpha\ (w).*sample\ (x, y, w)./white\ (x, y, w).$$

The present application captures hyperspectral data of a standard reference whiteboard in advance as white(x,y,w), and stores the records, then captures hyperspectral data of a sample as sample(x,y,w); then selects an unobstructed and unshaded whiteboard area within a certain range of the hyperspectral data sample(x,y,w) of the test sample, and labels the area as Area A; calculates a spectral average of the ROI on the sample image as $S_A(w)$; calculates a spectral average of whiteboard data in the same position as the ROI as $W_A(w)$; divides the two spectral averages, and obtains a correction coefficient alpha(w)=$W_A(w)./S_A(w)$; multiplies the whiteboard parameter ratio correction coefficient alpha (w) by a sample reflectance image matrix after whiteboard parameter ratio correction to obtain a final hyperspectral reflectance image matrix REFL(x,y,w)=alpha(w).* sample (x,y,w)./white(x,y,w). According to the present application, a whiteboard spectrum does not need to be independently collected, such that the data collection time is shortened, the analysis efficiency is improved, and the accuracy of hyperspectral analysis can be effectively improved; and in addition, the data captured at the same time is used to perform whiteboard parameter ratio correction, which results in the improvement of the reliability and repeatability of measurement.

6

BRIEF DESCRIPTION OF THE DRAWINGS

Comprising accompanying drawings to provide a further understanding of the embodiments and the drawings are incorporated into this specification and form part of this specification. The drawings illustrate the embodiments and are used in conjunction with the description to explain the principles of the present present disclosure. Many expected advantages of other embodiments and embodiments will be easily understood because they are better understood by referring to the following detailed description. By reading the detailed description of the non-limiting embodiments made with reference to the following accompanying drawings, other features, purposes and advantages of the present application will become more apparent:

FIG. 2 is a flowchart of a method of point-to-point whiteboard parameter ratio correction of hyperspectral images in an embodiment of the present application.

FIG. 6 is a schematic diagram of a whiteboard of jewelry detection using hyperspectral imaging technology in a specific embodiment of the present application.

DETAILED DESCRIPTION OF THE DISCLOSURE

This application is to be further described in detail below in combination with the accompanying drawings and embodiments. It is understood that the specific embodiments described herein are only used to explain the relevant application, not to define the application. It should further be noted that only the parts of the application are shown for ease of description.

It should be noted that, the embodiments and features in the embodiments of this application can be combined with each other without conflict. This application is described in detail below in combination with the accompanying drawings and embodiments.

Figure 1:
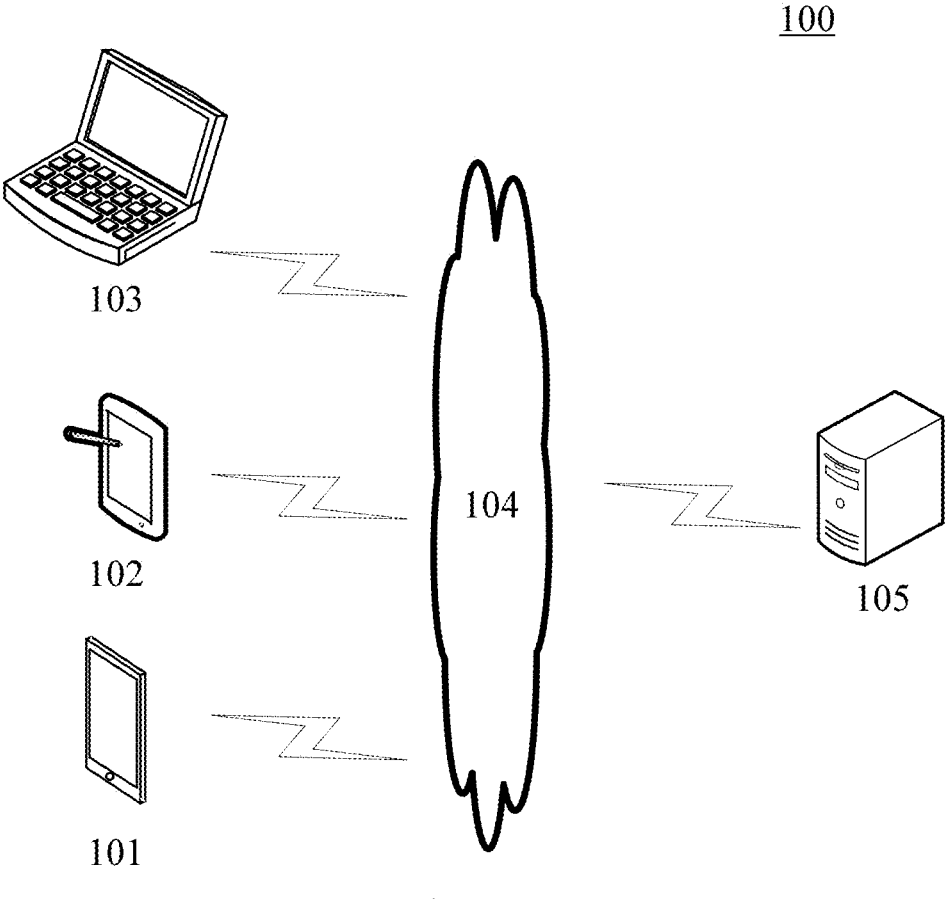
FIG. 1 is an example system architecture diagram that can be applied in this application.

FIG. 1 illustrates an exemplary system architecture 100 of a method for point-to-point whiteboard parameter ratio correction of hyperspectral images that can be applied according to an embodiment of the present application.

As shown in FIG. 1, the system architecture 100 may comprise terminal devices 101, 102, 103, network 104, and server 105. Network 104 is a medium used to provide communication links between terminal devices 101, 102, 103, and server 105. Network 104 can comprise various types of connections, such as wired, wireless communication links, or fiber optic cables, etc.

Users can interact with server 105 through network 104 using terminal devices 101, 102, 103 to receive or send messages, etc. Various applications can be installed on terminal devices 101, 102, and 103, such as data processing applications, data visualization applications, web browser applications, etc.

Terminal devices 101, 102, and 103 can be hardware or software. When terminal devices 101, 102, and 103 are hardware, they can be various electronic devices, comprising but not limited to smartphones, tablets, laptops, desktop computers. When terminal devices 101, 102, and 103 are software, they can be installed in the electronic devices listed above. It can be implemented as multiple software or software modules (such as software or software modules used to provide distributed services), or as a single software or software module. There is no specific restriction here.

Server 105 can be a server that provides various services, such as a backend information processing server that supports photos of the test samples displayed on terminal devices 101, 102, and 103. The backend information processing server can process the obtained hyperspectral data and generate processing results (such as hyperspectral reflectance image matrix).

It should be noted that, the method provided in the present embodiment of the application can be executed by server 105, or by terminal devices 101, 102, and 103. The corresponding devices are generally set in server 105, and can also be set in terminal devices 101, 102, and 103.

It should be noted that, the server can be hardware or software. When the server is hardware, it can be implemented as a distributed server cluster consisting of multiple servers, or as a single server. When the server is software, it can be implemented as multiple software or software modules (such as software or software modules used to provide distributed services), or as a single software or software module. There is no specific restriction here.

It should be understood that the number of terminal devices, networks, and servers in FIG. 1 is only illustrative. According to implementation requirements, it can have any number of terminal devices, networks, and servers.

According to a method for performing point-to-point whiteboard parameter ratio correction on hyperspectral images in an embodiment of the present application, FIG. 2 illustrates a flowchart of according to a method for performing point-to-point whiteboard parameter ratio correction on hyperspectral images in an embodiment of the present application. As shown in FIG. 2, the method comprises the following steps of:

S1: building a hardware scene for shooting, taking a photo of a standard reference whiteboard that will be used for point-to-point whiteboard parameter ratio correction, so as to obtain hyperspectral data of the standard reference whiteboard, and storing the hyperspectral data of the standard reference whiteboard as white(x, y,w), where x, y, and w represent the width, height, and wavelength of the photo, respectively;

S2: placing a test sample on the standard reference whiteboard, then taking a photo of the test sample to obtain hyperspectral data of the test sample, and storing the hyperspectral data of the test sample as sample(x, y,w), where x, y, and w represent the width, height, and wavelength of the photo of the test sample, respectively;

S3: selecting an unobstructed and unshaded area within a certain range of the standard reference whiteboard from the hyperspectral data sample(x,y,w) of the test sample, and labeling the area as Area A;

S4: calculating a spectral average of the Area A on the photo of the test sample, whose spectral average is represented as $S_A(w)$, calculating a spectral average called as $W_A(w)$ of an area from the hyperspectral data white(x,y,w) of the standard reference whiteboard which area has a same position as the Area A, and dividing $W_A(w)$ by $S_A(w)$ to obtain a whiteboard parameter ratio correction coefficient alpha(w)=$W_A(w)$ $./S_A(w)$; and S5: dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha (w) to obtain a corrected hyperspectral reflectance image matrix:

$$REFL(x, y, w) = \text{alpha } (w). * \text{sample } (x, y, w)./\text{white } (x, y, w).$$

In the specific embodiments, storing hyperspectral data of the standard reference whiteboard in advance as a prestored hyperspectral data of standard reference whiteboard, and using the prestored hyperspectral data of the standard reference whiteboard as the hyperspectral data of the standard reference whiteboard to perform the S2 to S5 within a certain time range.

In the specific embodiments, the standard reference whiteboard specifically comprises a whiteboard base and a protective cover:

The base thickness of the whiteboard is m millimeters, the shape and size of the outer contour of the whiteboard are designed according to the specific application scenario of the shooting, the shapes comprise square, round and oval.

The upper surface of the whiteboard base is covered with a coating with isotropic homogeneous diffuse reflection characteristics, and is provided with a recess area, called the Area A, which recess area has the depth of n millimeters (m>n), and the bottom and side walls of which recess area have a same diffuse reflection characteristic as that of the upper surface of the standard reference whiteboard, for comprising a diffuse reflection coating.

The recess area has one or more different location areas which have different shapes and sizes on the standard reference whiteboard.

The protective cover is a layer of spectral transparent material covering the surface of the standard reference whiteboard, which spectral transparent material is selected according to practical applications, comprises a transparent material with no obvious absorption characteristics within a spectral band range tested, and has wear resistance and easy cleaning characteristics, and has a thickness range of 0 to 10 millimeters.

The spectral transparent material specifically comprises quartz glass and sapphire crystal.

The protective cover is assembled on the recess area of the standard reference whiteboard, wherein the number of protective covers is the same as the number of the recess area.

Figure 3:
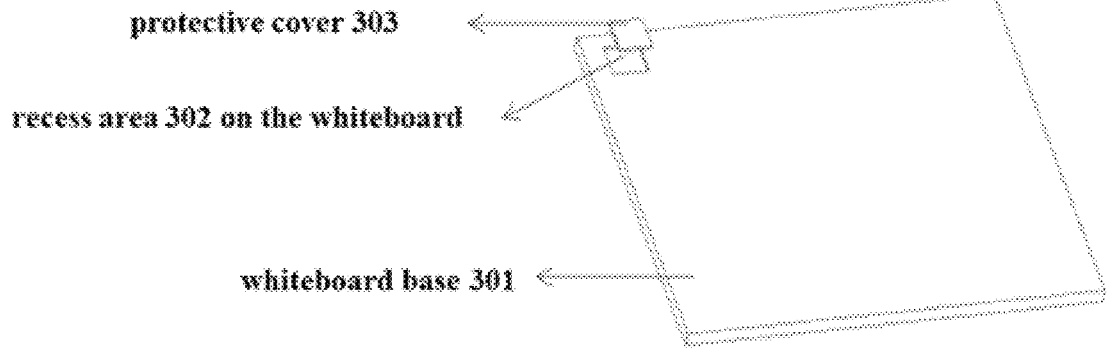
FIG. 3 is a structural diagram of a standard reference whiteboard in a specific embodiment of the present application.

FIG. 3 illustrates a structural diagram of a standard reference whiteboard in a specific embodiment of the present application, which mainly comprises a whiteboard base 301, a recess area 302 on the whiteboard, and a protective cover 303.

1. Whiteboard base 301: its thickness is m millimeters, and its shape and size of the outer contour are designed according to the specific application scenario of the shooting (it can be a square as shown in the figure, or a circular, a round or an oval, etc.). Its upper surface is covered with a coating with isotropic homogeneous diffuse reflection characteristics, and is provided with a recess area on its upper surface of the whiteboard (which is the area selected as the reference whiteboard), which recess area has the depth of n millimeters (m>n), and the bottom and side walls of which recess area have a same diffuse reflection characteristic as that of the upper surface of the whiteboard (which are coated with the same diffuse reflection coating as the whiteboard). The reference whiteboard area can be selected from different positions on the whiteboard, which can be of different shapes and sizes, and there can be multiple protected reference areas. When the whiteboard base 301 is heavily contaminated, a replacement whiteboard with the same structure can be used (the replacement of whiteboard base 301 is carried out at a fixed time interval or after shooting several test samples) to ensure the accuracy of the radiancy during shooting (namely that is to ensure the accuracy of the molecules in the calculation of reflectivity REFL(x,y,w)).

2. Protective cover 303: a layer of spectral transparent material covering the surface of the whiteboard. The material can be selected according to practical applications, which requires a transparent material with no obvious absorption characteristics within the tested spectral band range, and with wear resistance and easy cleaning characteristics. Its thickness is generally a few millimeters. Common materials comprise quartz glass, sapphire crystal, etc. The protective cover 303 will be installed at the recess area 302 on the whiteboard (the number of protective covers 303 is the same as the recess area 302 on the whiteboard), which is to protect the reference area from contamination and ensure the calculation accuracy of the whiteboard correction matrix (that is to ensure the accuracy of the denominator in the calculation of reflectivity REFL(x,y,w)=alpha(w).* sample(x,y,w)./white(x,y,w)). The protective cover 303 is easy to clean to increase the service life of the whiteboard.

After setting up the hardware scene for shooting, assembling the protective cover 303 on the whiteboard base 301, and then placing the entire assembled whiteboard on a designed sample shooting surface. When shooting, placing a sample on an area of the whiteboard which is uncovered with the protective cover 303 (or ensure that at least one protected reference area is not covered by the sample), and then collecting data.

In specific embodiments, during taking the photo of the standard reference whiteboard that will be used for point-to-point whiteboard parameter ratio correction, the protective cover is assembled on the whiteboard base to obtain an assembled standard reference whiteboard, and then the assembled standard reference whiteboard is placed on the shooting surface of the hardware scene for shooting a test sample.

When taking a photograph of the test sample, the test sample is placed in an area of the assembled standard reference whiteboard which is not protected by the protective cover.

In specific embodiments, when the whiteboard base is contaminated to a certain extent:

Replace the contaminated whiteboard base with a whiteboard base that has the same structure as the standard reference whiteboard.

The replacement is carried out at a fixed time interval or after shooting several test samples.

In specific embodiments, the method further comprise: analyzing the tested samples based on a corrected hyperspectral reflectance image matrix and with a chemometric model that has already been trained. The chemometric model comprises K-nearest neighbor (KNN), support vector machine (SVM), artificial neural network (ANN), and deep neural network (NN).

1) Specific Embodiment 1: Using the Method Described in the Present Application for Jewelry Detection FIG. 4 illustrates a specific embodiment of a hardware setup diagram of jewelry detection using hyperspectral imaging technology in the present application, and FIG. 5 illustrates a flowchart of this specific embodiment.

Figure 4:
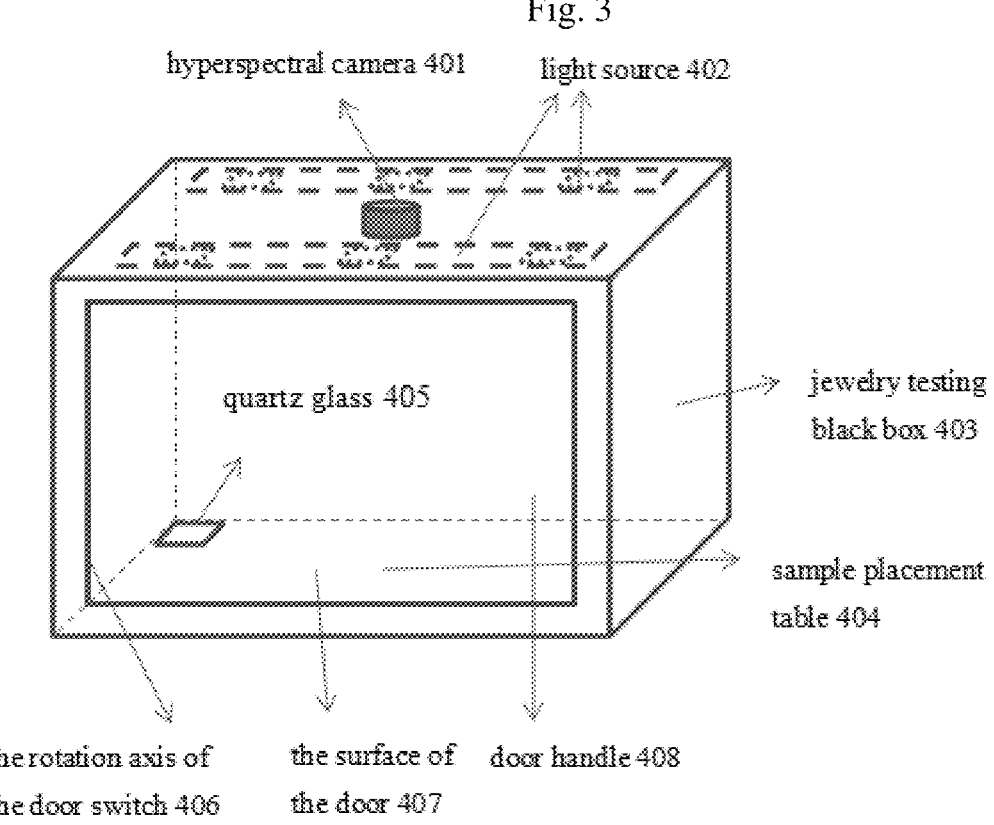
FIG. 4 is a hardware setup diagram of jewelry detection using hyperspectral imaging technology in a specific embodiment of the present application.
Figure 5:
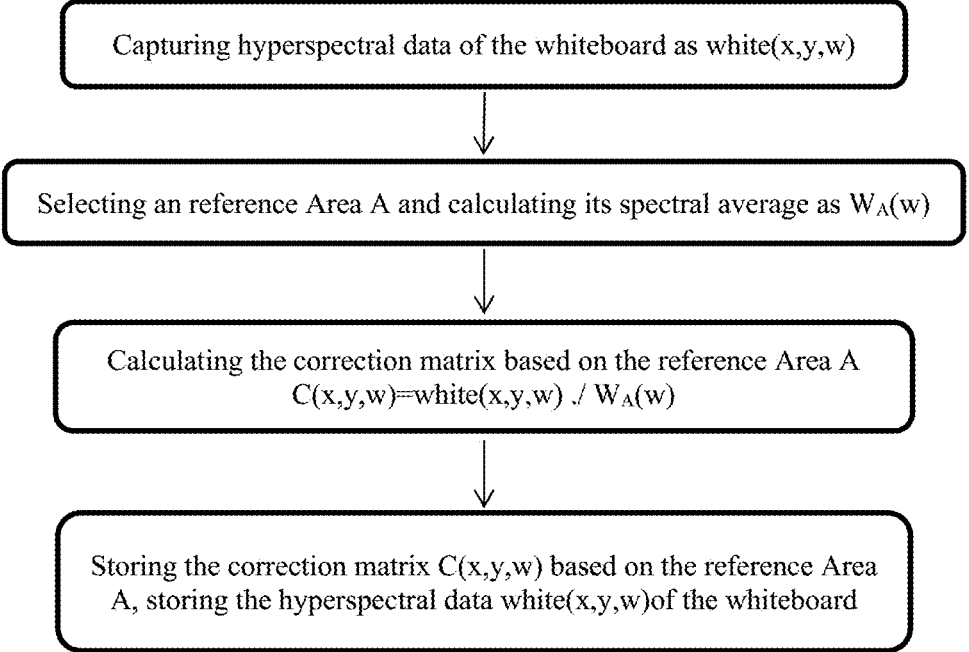
FIG. 5 is a flowchart of jewelry detection using hyperspectral imaging technology in a specific embodiment of the present application.

As shown in FIG. 4, the hardware setup comprise: a hyperspectral camera 401, a light source 402, a jewelry testing black box 403, a sample placement table 404, quartz glass 405, a rotation axis of the door switch 406, the surface of the door 407, a door handle 408.

Its characteristics are as follows:

The visible range of the hyperspectral camera 401 is exactly the size of the sample placement table 404.

All sides of the jewelry detection black box 403 are sealed and made of black material.

The detailed structure of sample placement table 404 and quartz glass 405 refers to the glass protection plan of the whiteboard. The area protected by quartz glass 405 is selected in a corner of the sample placement table 404. When placing the tested sample, trying to place it in the center position and keeping the area protected by quartz glass 405 uncovered.

406, 407, and 408 are the structural combinations of doors. The door is opened to place samples, and after closing the door, jewelry samples are tested.

After the hardware is set up, the correction parameters are stored: ensuring that the sample placement table is in a clean and sample free state, taking the hyperspectral data white (x,y,w) of a pure whiteboard, calculating the spectral average of the whiteboard in the glass protection Area A as $W_A(w)$, calculating the whiteboard parameter ratio correction matrix based on the glass protection area: making $W_A(w)$ to do matrix element-wise division with each pixel (x, y) in white(x,y,w): $C(x,y,w)=white(x,y,w)./W_A(w)$; storing the correction matrix C(x,y,w), which can be called directly in future applications.

FIG. 6 illustrates a schematic diagram of a whiteboard where the jewelry detection uses hyperspectral imaging technology in a specific embodiment of the present application. Conduct jewelry inspection refers to the calibration whiteboard diagram 601 and the shoot whiteboard diagram 602 in FIG. 6:

Step 1: Calibration

As shown in the calibration whiteboard schematic diagram 601, keeping the whiteboard shooting surface free of contaminants, and separately capturing the whiteboard hyperspectral data for calculating the whiteboard correction matrix. This step can be completed when the hyperspectral product is shipped or installed for the customers, or be updated by professional staff after the equipment has been working continuously for a period of time. Specific methods: capturing hyperspectral data of the whiteboard as white(x,y,w) and selecting a fixed initial reference area (an area of n*n pixel size, such as the area marked at position A in the image), then calculating the spectral average of the reference Area A: $W_A(w)=\langle white(A,w)\rangle_A$, where $\langle m\rangle_B$ represents that calculating the average of m within an area B. Calculating the correction matrix $C(x,y,w)$ and divide the spectrum of each pixel in $white(x,y,w)$ by the spectral average of reference Area A, namely $(x,y,w)= white(x,y,w)./W_A(w)$, where "./" represents the Hadamard quotient of two vectors. The hyperspectral data $white(x,y,w)$ and correction matrix $C(x,y,w)$ of the whiteboard are stored in the device memory.

Step 2: Shoot

1. Placing the jewelry sample on the whiteboard as shown in schematic diagram 602 and capturing hyperspectral data of the jewelry sample as $sample(x,y,w)$.

2. In the hyperspectral data of the captured jewelry, the spectral average of the glass protection region A is calculated: $S_A(w)=\langle sample(A,w)\rangle_A$; and read the correction matrix $C(x,y,w)$ in memory.

3. Restoring the whiteboard data at this time, denoting it as $white_N(x,y,w)$, and make each pixel (x, y) in $C(x,y,w)$ to do Hadamard product with $S_A(W)$ separately: $white(x,y,w)=C(x,y, w).*S_A(W)$. The "*" represents the Hadamard product of two vectors or matrices.

4. Calculating the reflectance, namely $REFL(x,y,w)=sample(x,y,w)/white_N(x,y,w)$.

5. Based on the reflectance, using chemometric models such as trained K-nearest neighbor (KNN), support vector machine (SVM), artificial neural network (ANN), deep neural network (NN), etc., to analyze the types, authenticity, and optimization of jewelry.

Figure 7:
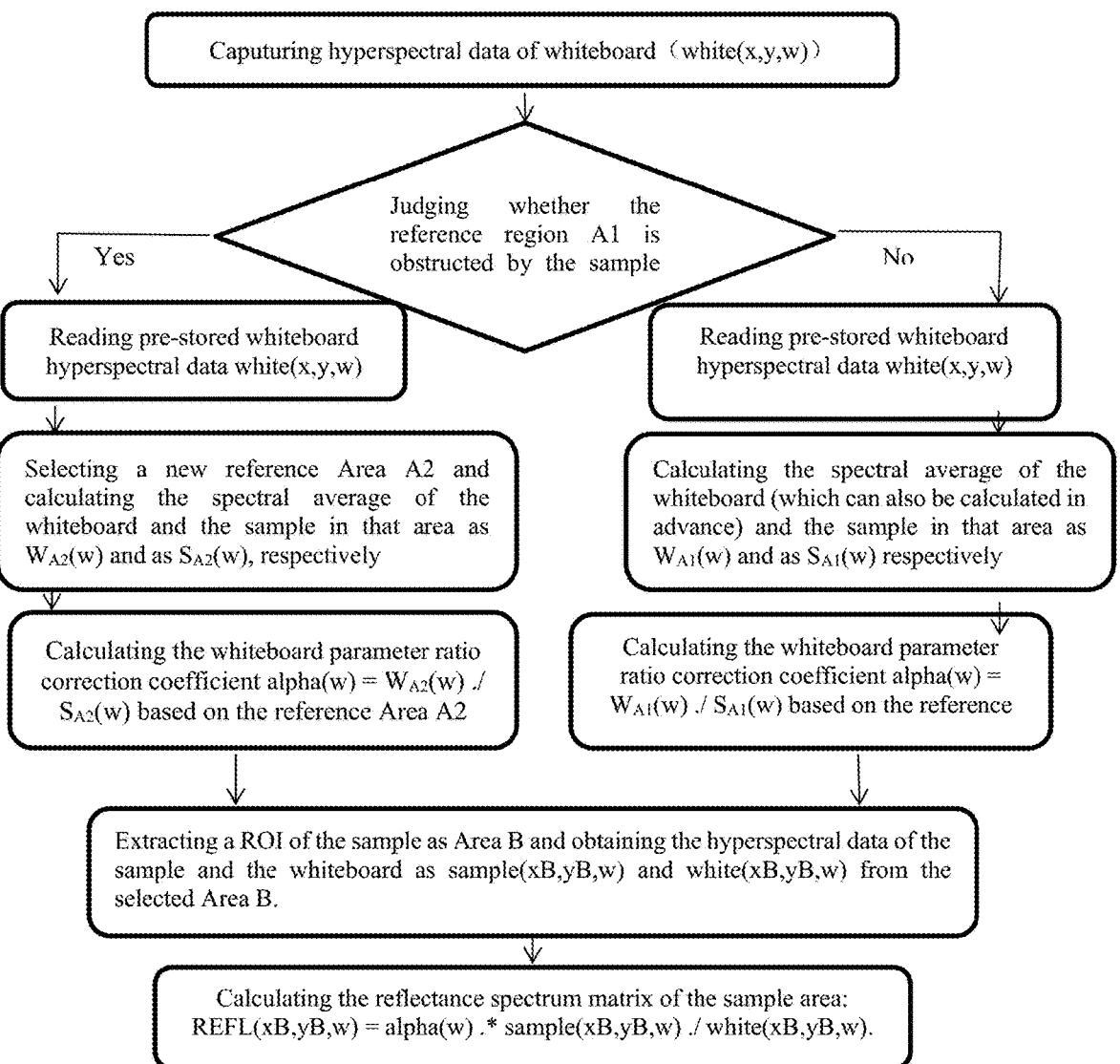
FIG. 7 is a flowchart of measuring the color of gemstones using hyperspectral imaging technology in a specific embodiment of the present application.

2) Specific Embodiment 2: Using the Method Described in the Present Application to Measure the Color of Gemstones FIG. 7 illustrates a flowchart of measuring the color of gemstones using hyperspectral imaging technology in a specific embodiment of the present application, the specific steps are as follows:

There is an initial reference Area A1, judging whether the reference region A1 is obstructed by the sample based on the hyperspectral data of the sample, if it is not obstructed, confirming the reference Area A1 is valid, then calculating the spectral average of the whiteboard (which can also be calculated in advance) and the sample in that area as $W_{A1}(w)$ and as $S_{A1}(w)$ respectively, and obtaining the whiteboard parameter ratio correction coefficient $alpha(w)=W_{A1}(w)./S_{A1}(w)$.

If it is obstructed, reading the pure whiteboard hyperspectral data $white(x,y,w)$ from the memory, selecting a new reference Area A2, and calculating the whiteboard parameter ratio correction coefficient $alpha(w)=W_{A2}(w)./S_{A2}(w)$ based on the reference Area A2.

Extracting a ROI of the sample as Area B and obtaining the hyperspectral data of the sample and the whiteboard as $sample(xB,yB,w)$ and $white(xB,yB,w)$ from the selected Area B.

Calculating the reflectance spectrum matrix of the sample area:

$$REFL(xB, yB, w) = alpha\ (w). * sample\ (xB, yB, w)./white\ (xB, yB, w).$$

After obtaining the data of reflectance spectrum matrix of the gemstone area, the specific color value of the gemstone can be calculated by using the calculation method of color theory, and further analysis can be conducted based on this foundation.

It should be recognized that the initial reference Area A1 can be chosen on anywhere of sample placement surface, theoretically. However, in practical applications, the best choice for position A1 is to choose a corner position on the sample placement surface that is not easily covered by the sample, therefore, selecting a corner of the sample placement surface, preferentially.

Figure 8:
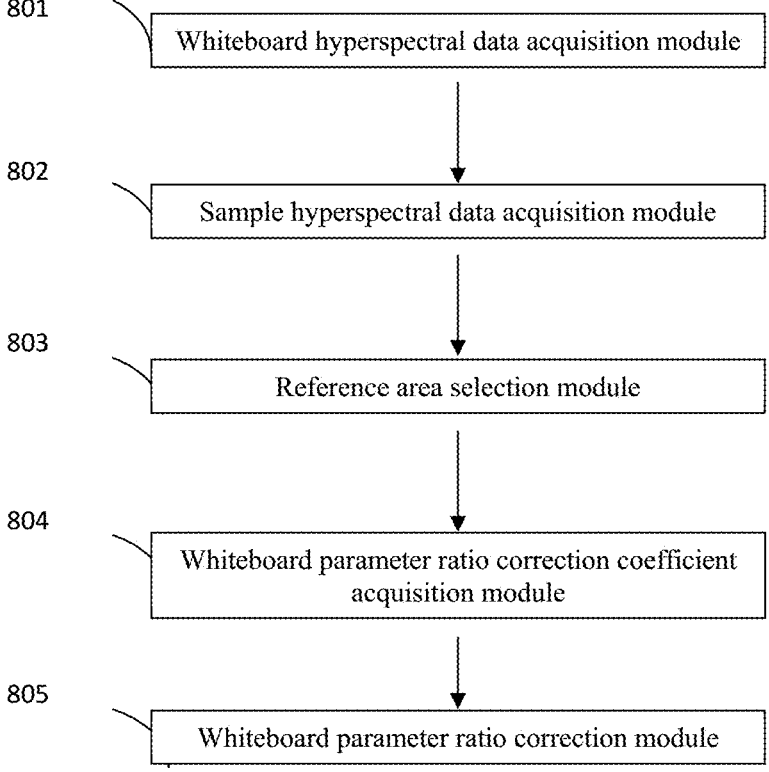
FIG. 8 is a framework diagram of a system for point-to-point whiteboard parameter ratio correction of hyperspectral images in an embodiment of the present application.

FIG. 8 illustrates a framework diagram of a system for point-to-point whiteboard parameter ratio correction of hyperspectral images in an embodiment of the present application. The system comprises a whiteboard hyperspectral data acquisition module 801, a sample hyperspectral data acquisition module 802, a reference area selection module 803, a whiteboard parameter ratio correction coefficient acquisition module 804, and a whiteboard parameter ratio correction module 805.

In specific embodiments, the whiteboard hyperspectral data acquisition module 801 is configured for building a hardware scene for shooting, taking a photo of a standard reference whiteboard that will be used for point-to-point whiteboard parameter ratio correction, so as to obtain hyperspectral data of the standard reference whiteboard, and storing the hyperspectral data of the standard reference whiteboard as $white(x,y,w)$, where x, y, and w represent the width, height, and wavelength of the photo, respectively.

The sample hyperspectral data acquisition module 802 is configured for placing a test sample on the standard reference whiteboard, then taking a photo of the test sample to obtain hyperspectral data of the test sample, and storing the hyperspectral data of the test sample as $sample(x,y,w)$, where x, y, and w represent the width, height, and wavelength of the photo of the test sample, respectively.

The reference area selection module 803 is configured for selecting an unobstructed and unshaded area within a certain range of the standard reference whiteboard from the hyperspectral data $sample(x,y,w)$ of the test sample, and labeling the area as Area A.

The whiteboard parameter ratio correction coefficient acquisition module 804 is configured for calculating a spectral average of the Area A on the photo of the test sample, whose spectral average is represented as $S_A(w)$, calculating a spectral average called as $W_A(w)$ of an area from the hyperspectral data $white(x,y,w)$ of the standard reference whiteboard which area has a same position as the Area A, and dividing $W_A(w)$ by $S_A(w)$ to obtain a whiteboard parameter ratio correction coefficient $alpha(w)=W_A(w)./S_A(w)$.

The whiteboard parameter ratio correction module 805 is configured for dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient $alpha(w)$ to obtain a corrected hyperspectral reflectance image matrix: $REFL(x,y,w)=alpha(w).*sample(x,y,w)./white(x,y,w)$.

The system captures hyperspectral data of a standard reference whiteboard in advance as $white(x,y,w)$, and stores the records, then captures hyperspectral data of a sample as $sample(x,y,w)$; then selects an unobstructed and unshaded whiteboard area within a certain range of the hyperspectral data $sample(x,y,w)$ of the test sample, and labels the area as Area A; calculates a spectral average of the ROI on the sample image as $S_A(w)$; calculates a spectral average of whiteboard data in the same position as the ROI as $W_A(w)$;

divides the two spectral averages, and obtains a correction coefficient alpha(w)=$W_A$(w)./$S_A$(w); multiplies the whiteboard parameter ratio correction coefficient alpha(w) by a sample reflectance image matrix after whiteboard parameter ratio correction to obtain a final hyperspectral reflectance image matrix REFL(x,y,w)=alpha(w).*sample(x,y,w)./white (x,y,w). According to the present application, a whiteboard spectrum does not need to be independently collected, such that the data collection time is shortened, the analysis efficiency is improved, and the accuracy of hyperspectral analysis can be effectively improved; and in addition, the data captured at the same time is used to perform whiteboard parameter ratio correction, which results in the improvement of the reliability and repeatability of measurement.

Figure 9:
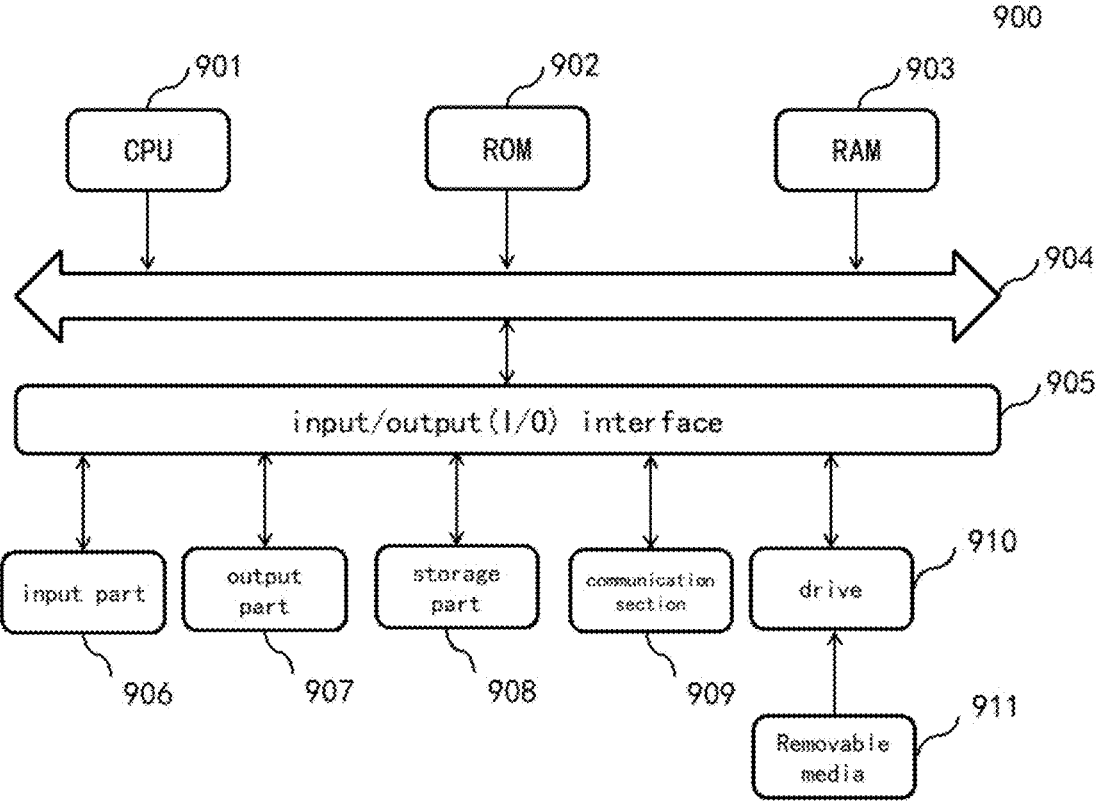
FIG. 9 is a structural diagram of a computer system suitable for implementing the electronic device in the present embodiment of the application.

Referring to FIG. 9, it shows a schematic diagram of the structure of a computer system 900 suitable for implementing the electronic equipment of the embodiments of this application. The electronic device shown in FIG. 9 is only an example and should not impose any limitations on the functionality and scope of use of the embodiments of this application.

As shown in FIG. 9, the computer system 900 comprises a central processing unit (CPU) 901, which can perform various appropriate actions and processing based on programs stored in read-only memory (ROM) 902 or loaded from storage section 908 into random access memory (RAM) 903. In RAM 903, various programs and data required for the operation of the system 900 are also stored. CPU 901, ROM 902, and RAM 903 are connected to each other via bus 904. The input/output (I/O) interface 905 is also connected to bus 904.

The following parts are connected to the I/O interface 905: the input part 906 such as the keyboard, mouse, etc., and the output part 907 such as liquid crystal display (LCD), loudspeaker, etc., and the storage part 908 such as hard disk, etc., and the communication part 909 of network interface cards such as LAN card, modem, etc. The communications section 909 performs communication processing over the network such as the Internet. The drive 910 is also connected to the I/O interface 905 as required. Removable media 911, such as disk, optical disc, magnetic disc, semiconductor memory, etc., are installed on drive 910 as required, so that computer programs read from it are installed into the storage part 908 as required.

In particular, according to embodiments of the present disclosure, the process described in the reference flow chart above may be implemented as a computer software program. For example, the embodiments of the present disclosure comprise a computer program product comprising a computer program carried on a computer-readable storage medium, comprising program code for executing the method shown in the flowchart. In such embodiments, the computer program can be downloaded and installed from the network through the communication section 909, and/or installed from the removable medium 911. When the computer program is executed by the central processing unit (CPU) 901, the above-mentioned functions defined in the method of this application are executed. It should be noted that the computer readable storage medium described in this application can be a computer readable signal medium, a computer readable storage medium, or any combination of the above two. Computer readable storage media can be but not limited to, electrical, magnetic, optical, electromagnetic, infrared, or semiconductor systems, devices or devices, or any combination of the above. More specific examples of computer readable storage media may comprise but not limited to: electrical connections with one or more wires, portable computer disk, hard drive, random access memory (RAM), read-only memory (ROM), erasable programmable read-only memory (EPROM or flash), fiber optic, portable compact disk read-only memory (CD-ROM), optical storage device, magnetic storage device, or any suitable combination of the above. In this application, the computer-readable storage medium may be any tangible medium containing or storing a program, which may be used by an instruction execution system, device, or device, or in combination with it. In this application, a computer-readable signal medium may be comprised in the baseband or as a data signal propagated as part of the carrier wave, which carries computer-readable program code. This type of transmitted data signal can take various forms, comprising but not limited to electromagnetic signal, optical signal, or any suitable combination of the above. A computer-readable signal medium can also be any computer-readable storage medium other than a computer-readable storage medium, which can send, propagate, or transmit program used by or in combination with instruction execution system, equipment, or device. The program code contained on computer-readable storage media can be transmitted with any appropriate medium, comprising but not limited to: wireless, wire, fiber optic cable, RF, etc., or any suitable combination of the above.

Computer program code for executing the operations of the present application may be written in one or more programming languages or combinations thereof, comprising object-oriented programming languages such as Java, Smalltalk, C++, and conventional procedural programming languages such as C or similar programming languages. Program code can be completely executed on the user's computer, partially executed on the user's computer, executed as an independent software package, partially executed on the user's computer, partially executed on a remote computer, or completely executed on a remote computer or server. In case involving remote computers, remote computer can connect to user computer through any type of network, comprising local area network (LAN) or wide area network (WAN), or can connect to external computer (such as using internet service providers to connect via the internet).

The flowchart and block diagram in the attached figure illustrate the possible architecture, functions, and operations of the system, methods, and computer program products according to various embodiments of the present application. In this, each box in a flowchart or block diagram can represent a module, program segment, or part of code that contains one or more executable instructions for implementing the specified logical function. It should also be noted that in some alternative implementations, the functions indicated in the box can also occur in a different order than those indicated in the accompanying drawings. For example, two consecutive boxes can actually be executed in basic parallel, and sometimes they can also be executed in opposite order, it depends on the functionality involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The modules described in the embodiments of this application can be implemented through software or hardware. The described units can also be set in the processor, and the names of these units do not constitute a limitation on the unit itself in some cases.

The embodiments of the present application also involve a computer-readable storage medium on which a computer program is stored, and the method described above is implemented when the computer program is executed by a computer processor. This computer program contains program code for executing the method shown in the flowchart. It should be noted that the computer-readable medium of this application can be a computer-readable signal medium, a computer-readable medium, or any combination of the above two.

The application captures hyperspectral data of a standard reference whiteboard in advance as white(x,y,w), and stores the records, then captures hyperspectral data of a sample as sample(x,y,w); then selects an unobstructed and unshaded whiteboard area within a certain range of the hyperspectral data sample(x,y,w) of the test sample, and labels the area as Area A; calculates a spectral average of the ROI on the sample image as $S_A(w)$; calculates a spectral average of whiteboard data in the same position as the ROI as $W_A(w)$; divides the two spectral averages, and obtains a correction coefficient alpha(w)=$W_A(w)./S_A(w)$; multiplies the whiteboard parameter ratio correction coefficient alpha(w) by a sample reflectance image matrix after whiteboard parameter ratio correction to obtain a final hyperspectral reflectance image matrix REFL(x,y,w)=alpha(w).*sample(x,y,w)./white (x,y,w). According to the present application, a whiteboard spectrum does not need to be independently collected, such that the data collection time is shortened, the analysis efficiency is improved, and the accuracy of hyperspectral analysis can be effectively improved; and in addition, the data captured at the same time is used to perform whiteboard parameter ratio correction, which results in the improvement of the reliability and repeatability of measurement.

The above description is only a preferred embodiment of this application and an explanation of the technical principles used. Technicians in this field should understand that the scope of the invention referred to in this application is not limited to technical solutions formed by specific combinations of the aforementioned technical features, and should also cover other technical solutions formed by arbitrary combinations of the aforementioned technical features or their equivalent features without departing from the aforementioned invention concept. For example, a technical solution formed by replacing the above features with (but not limited to) technical features with similar functions is disclosed in this application.

The invention claimed is:

1. A method for performing point-to-point whiteboard parameter ratio correction of hyperspectral images, comprising the following steps of:

S1: placing a test sample on a standard reference whiteboard, then taking a photo of the test sample to obtain hyperspectral data of the test sample, and storing the hyperspectral data of the test sample as sample(x,y,w), where x, y, and w represent the width, height, and wavelength of the photo of the test sample, respectively;

S2: selecting an unobstructed and unshaded area within a certain range of the standard reference whiteboard from the hyperspectral data sample(x,y,w) of the test sample, and labeling the area as Area A;

S3: calculating a spectral average of the Area A on the photo of the test sample, whose spectral average is represented as $S_A(w)$, calculating a spectral average called as $W_A(w)$ of an area from hyperspectral data called as white(x,y,w) of the standard reference whiteboard obtained by taking a photo of the standard reference whiteboard, which area has a same position as the Area A, and dividing $W_A(w)$ by $S_A(w)$ to obtain a whiteboard parameter ratio correction coefficient alpha(w)=$W_A(w)./S_A(w)$; and S4: dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha (w) to obtain a corrected hyperspectral reflectance image matrix:

$$REFL(x, y, w) = alpha\ (w).*sample\ (x, y, w)./white\ (x, y, w).$$

2. The method according to claim 1, wherein the hyperspectral data called as white(x,y,w) of the standard reference whiteboard is obtained by: building a hardware scene for shooting, taking the photo of the standard reference whiteboard that will be used for point-to-point whiteboard parameter ratio correction, so as to obtain the hyperspectral data of the standard reference whiteboard, storing hyperspectral data of the standard reference whiteboard in advance as a prestored hyperspectral data of standard reference whiteboard, and during performing the method within a certain time range, using the prestored hyperspectral data of the standard reference whiteboard as the hyperspectral data of the standard reference whiteboard.

3. The method according to claim 1, wherein the standard reference whiteboard specifically comprises a whiteboard base:

the base thickness of the whiteboard is m millimeters, the shape and size of the outer contour of the whiteboard are designed according to a specific application scenario of the shooting, and the shapes comprise square, round and oval;

the upper surface of the whiteboard base is covered with a coating with isotropic homogeneous diffuse reflection characteristic, and is provided with a recess area, called Area A, which recess area has the depth of n millimeters (m>n), and the bottom and side walls of which recess area have a same diffuse reflection characteristic as that of the upper surface of the standard reference whiteboard for comprising a diffuse reflection coating;

the recess area has one or more different location areas which have different shapes and sizes on the standard reference whiteboard.

4. The method according to claim 3, wherein the standard reference whiteboard further comprises a protective cover:

the protective cover is a layer of spectral transparent material covering the surface of the standard reference whiteboard, which spectral transparent material is selected according to practical applications, comprises a transparent material with no obvious absorption characteristics within a spectral band range tested, and has wear resistance and easy cleaning characteristics, and has a thickness range of 0 to 10 millimeters;

the spectral transparent material specifically comprises quartz glass and sapphire crystal;

the protective cover is assembled on the recess area of the standard reference whiteboard, wherein the number of protective covers is the same as the number of the recess area.

5. The method according to claim 4, wherein during taking the photo of the standard reference whiteboard that will be used for point-to-point whiteboard parameter ratio correction, the protective cover is assembled on the white-board base to obtain an assembled standard reference white-board, and then the assembled standard reference white-board is placed on a shooting surface of the hardware scene for shooting the test sample;

during taking the photo of the test sample, the test sample is placed on an area within the assembled standard reference whiteboard, which area is not protected by the protective cover.

6. The method according to claim 3, wherein when the whiteboard base is contaminated to a certain extent, the contaminated whiteboard base is replaced with a whiteboard base that has the same structure as the standard reference whiteboard;

the replacement is carried out at a fixed time interval or after shooting several test samples.

7. The method according to claim 1, wherein the method further comprises: analyzing the test sample based on the corrected hyperspectral reflectance image matrix and with a trained chemometric model that comprises K-nearest neigh-bor (KNN), support vector machine (SVM), artificial neural network (ANN), and deep neural network (NN).

8. A non-transitory computer-readable medium for storing executable instructions, which cause a method to be per-formed, the method comprising:

S1: placing a test sample on a standard reference white-board, then taking a photo of the test sample to obtain hyperspectral data of the test sample, and storing the hyperspectral data of the test sample as sample(x,y,w), where x, y, and w represent the width, height, and wavelength of the photo of the test sample, respec-tively;

S2: selecting an unobstructed and unshaded area within a certain range of the standard reference whiteboard from the hyperspectral data sample(x,y,w) of the test sample, and labeling the area as Area A;

S3: calculating a spectral average of the Area A on the photo of the test sample, whose spectral average is represented as $S_A(w)$, calculating a spectral average called as $W_A(w)$ of an area from hyperspectral data called as white(x,y,w) of the standard reference white-board obtained by taking a photo of the standard reference whiteboard, which area has a same position as the Area A, and dividing $W_A(w)$ by $S_A(w)$ to obtain a whiteboard parameter ratio correction coefficient alpha(w)=$W_A(w)./S_A(w)$; and S4: dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha (w) to obtain a corrected hyperspectral reflectance image matrix:

$$REFL(x, y, w) = \text{alpha } (w). * \text{sample } (x, y, w)./\text{white } (x, y, w).$$

9. A system for performing point-to-point whiteboard parameter ratio correction of hyperspectral image, wherein it comprises:

sample hyperspectral data acquisition module: configured for placing a test sample on a standard reference whiteboard, then taking a photo of the test sample to obtain hyperspectral data of the test sample, and storing the hyperspectral data of the test sample as sample(x, y,w), where x, y, and w represent the width, height, and wavelength of the photo of the test sample, respec-tively;

reference area selection module: configured for selecting an unobstructed and unshaded area within a certain range of the standard reference whiteboard from the hyperspectral data sample(x,y,w) of the test sample, and labeling the area as Area A;

whiteboard parameter ratio correction coefficient acqui-sition module: configured for calculating a spectral average of the Area A on the photo of the test sample, whose spectral average is represented as $S_A(w)$, calcu-lating a spectral average called as $W_A(w)$ of an area from hyperspectral data called as white(x,y,w) of the standard reference whiteboard obtained by taking a photo of the standard reference whiteboard, which area has a same position as the Area A, and dividing $W_A(w)$ by $S_A(w)$ to obtain a whiteboard parameter ratio cor-rection coefficient alpha(w)=$W_A(w)./S_A(w)$; and whiteboard parameter ratio correction module: configured for dividing the hyperspectral data of the test sample by the hyperspectral data of standard reference whiteboard to obtain a reflectance hyperspectral matrix, and then multiplying the reflectance hyperspectral matrix by the whiteboard parameter ratio correction coefficient alpha (w) to obtain a corrected hyperspectral reflectance image matrix:

$$REFL(x, y, w) = \text{alpha}(w). * \text{sample } (x, y, w)./\text{white}(x, y, w).$$

* * * * *